US012756714B2

(12) United States Patent
Balakrishnan et al.

(10) Patent No.: US 12,756,714 B2
(45) Date of Patent: Oct. 6, 2026

(54) PRIVILEGED ACTIONS APPROVAL SYSTEM

(71) Applicant: Dell Products L.P., Round Rock, TX (US)

(72) Inventors: Ananthakrishnan Balakrishnan, Edison, NJ (US); Seema M. Tahaliyani, Southborough, MA (US); Yuanyuan Zhang, Newark, CA (US)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 18/910,955

(22) Filed: Oct. 9, 2024

(65) Prior Publication Data

US 2026/0100955 A1 Apr. 9, 2026

(51) Int. Cl.

*G06F 15/16* (2006.01)
*G06F 9/54* (2006.01)
*H04L 9/40* (2022.01)
*H04L 29/06* (2006.01)

(52) U.S. Cl.

CPC .................................. *H04L 63/102* (2013.01)

(58) Field of Classification Search

CPC ............................... H04L 63/102; G06F 21/31
USPC .............................................................. 726/4
See application file for complete search history.

(56) References Cited

U.S. PATENT DOCUMENTS 11,165,783 B1 * 11/2021 Eiers ..................... G06F 9/4498
12,326,833 B2 * 6/2025 Wee ...................... G06F 16/122
2012/0198512 A1 * 8/2012 Zhou ..................... H04L 47/122 726/1
2020/0007536 A1 * 1/2020 Piel ....................... H04L 63/108
2022/0292372 A1 * 9/2022 Joshy ............... G06Q 10/06311
2022/0327198 A1 * 10/2022 Simpson ................. G06F 21/31
2023/0299843 A1 * 9/2023 Boyd ................. H04B 7/18532 455/12.1
2023/0376904 A1 * 11/2023 Alwusaibie .......... G06Q 10/103
2024/0179148 A1 * 5/2024 Dayan ................... H04L 63/102
2025/0094549 A1 * 3/2025 Donthula ................ G06F 21/31
2025/0259145 A1 * 8/2025 Shrivastava ......... G06Q 10/109
2025/0307669 A1 * 10/2025 Moyal .................... G06N 5/025
2025/0322333 A1 * 10/2025 Huang ............. G06Q 10/06316

* cited by examiner

*Primary Examiner* — Hamza N Algibhah
(74) *Attorney, Agent, or Firm* — Amin, Turocy & Watson, LLP

(57) ABSTRACT

A computing system facilitates a privileged action approval system that receives approval for a user entity to perform a privileged action with respect to a protected computing resource or platform. One or more approval entities may be assigned by an administrative entity to approve execution of the privileged action, wherein the administrative entity is not assigned an ability to approve execution of the privileged action. The approval system may be configured with information indicative of the one or more approval entities and upon obtaining approval by the approval entities may direct, to the user entity, approval information, for example a token, that may comprise a request identifier. The approval system may determine whether a privileged action matches information associated with the request identifier and may facilitate execution of the requested action based on the requested privileged action being determined to match information associated with the request identifier.

20 Claims, 18 Drawing Sheets

100

800

900

1100

1200

1300

| | Privileged Action API Information | Privileged Action Description | Number of Approval Entities |
|---|---|---|---|
| A | POST /paas/status?enable=true | Enable PAAS | PAA Entity/$Entites_A$ |
| B | GET /paas/status | Query PAAS status | PAA Entity/$Entites_B$ |
| C | POST /paas/approval-entities | Create approval entity | PAA Entity/$Entites_C$ |
| D | GET /paas/approval-entities/{id} | List approval entities | PAA Entity/$Entites_D$ |
| E | GET /paas/approval-entities | Get an approval entity info | PAA Entity/$Entites_E$ |
| F | DELETE /paas/approval-entities/{id} | Delete an approval entity | PAA Entity/$Entites_F$ |
| G | PUT /paas/approval-entities/approval-entity/password | Reset password by approval entity | PAA Entity/$Entites_G$ |
| H | PUT /paas/approval-entities/approval-entity/reset-password | Security admin resets an approval entity's password | PAA Entity/$Entites_H$ |
| I | POST /paas/requests | Create PAA request | PAA Entity/$Entites_I$ |
| . . . | . . . | . . . | . . . |
| n | $API_n$ | $API_n$ Description | PAA Entity/$Entites_n$ |

1405 1410 1415

1400

FIG. 14

| PrivilegedActions | |
|---|---|
| paas | CreateApprovalEntity |
| | DeleteApproveEntity |
| | EnablePlatformProtection |
| | DisablePlatformProtection |
| | ResetPassword |
| platform | EscalatePermission |
| iam | DisableAccountProtection |
| objControl | PutBucketLockConfiguration |
| s3 | PutBucketObjectLockConfiguration |
| | PutObjectRetention |
| | RetentionOverrideDelete |

1505 1510

1500

FIG. 15

APM – Privileged actions

| Service | Resource Type | Action | API | PAA Request Support | UI Support |
|---|---|---|---|---|---|
| S3 | Bucket | PutObjectLockConfiguration | PUT /?object-lock | Yes | No |
| | Object | PutObjectRetention with bypass governance | PUT /{Key+}?retention&versionId=VersionId x-amz-bypass-governance-retention: true | Yes | No |
| | | DeleteObject(version) with bypass governance | DELETE /Key+?versionId=VersionId x-amz-bypass-governance-retention: true | Yes | No |
| ObjControlsvc | Bucket | PutBucketLockConfiguration | PUT /object/bucket/{bucketName}/object-lock-config | Yes | Yes |
| IAM | Account | DisableAccountProtection | POST /iam?Action=DisableAccountProtection | Yes | Yes |

1705 1710 1715

1700

FIG. 17

PRIVILEGED ACTIONS APPROVAL SYSTEM

BACKGROUND

The term 'cloud' may refer to a set, group, collection, or other plurality of computing resources, components, services, instances, collections, application, and the like that may be accessed by a computing resource, typically via a communication network (a communication network may also be referred to as a cloud). The term 'cloud' is typically used in reference to the computing resources without referencing specific items that make up the cloud resources when discussing computing functionality from the perspective of a computing resource that may make use of the functionality.

A cloud computing service provider may make available various computing resources, for example, software as a service, virtual machines, storage, bare metal computing hardware, or even a complete enterprise's infrastructure and development platforms, over a communication network. A cloud services provider may make a public cloud computing resource available to users over a publicly accessible network, such as the Internet. A private cloud computing resource is typically available or accessible only by a given customer, such as an enterprise and its employees. Computing resources may be provided from an enterprise's own on-premises data center or from a data center operated by an independent (e.g., independent from the enterprise customer) cloud services provider. A hybrid cloud may connect an organization's private cloud services and resources of public clouds into an infrastructure that facilitates the organization's applications and workloads in a manner that, for example, balances the increase, e.g., maximizing, of performance and the decrease, e.g., minimizing, of costs across public and private cloud computing resources.

Cloud providers, whether providers of public or private computing resources, may use clustering of servers. A server cluster typically comprises servers that share a single Internet Protocol ("IP") address. Clustering enhances data protection typically, availability, load balancing, and scalability. A server associated with a cluster may be referred to as a node, which may comprise a hard drive, random access memory, ("RAM"), and central processing unit ("CPU") resources. In a hybrid cloud environment, it is desirable for an organization to use resources of its private cloud as much as possible and use public cloud computing resources to handle spikes in usage demands that would exceed a determined limit, or a capacity, of the organization's private network. Moreover, it is desirable for an organization to optimize (e.g., minimize) costs related to use of public cloud resources. An organization's private cloud computing system, or systems, may comprise active components, modules, storage, services, and other resources that facilitate computing needs of the enterprise. An organization's private cloud computing resources may also comprise idle, or inactive, components, modules, storage, services, and other resources that are essentially held in reserve, but are not used, until workload increases require additional resources than the active resources already being used and paid for by the enterprise. The enterprise may subscribe to the computing resources of their private network from a computing resources provider/cloud computing provider instead of maintaining the resources and owning them outright. A provider may increase a subscription fee when an enterprise activates idle/inactive resources. The subscription may include a warranty cost associated with given active computing resources, such as storage, a processing components or instances, network bandwidth, and the like. Typically, the more a resource has been used, the more 'wear' has been placed on it. Thus, an organization desires to find an optimal balance of use of private and public cloud resources to maximize performance and to facilitate supporting computing workloads of the organization while minimizing costs for computing resources and services whether public or private.

An organization may have multiple providers of public computing resources (e.g., multiple providers of public cloud computing resources) to choose from in handing its workloads for which it uses public cloud resources. Pricing from one public computing provider for a given service may be less that pricing for the same service from another provider, but the pricing between the two providers may change with the previously more costly provider becoming the lower cost provider. However, costs to switch providers, especially costs to transfer large volume of data from one provider to another is prohibitively high.

The above-described description is merely intended to provide a contextual overview regarding cloud computing, and is not intended to be exhaustive.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, an example method may comprise receiving, by at least one computing system comprising at least one processor, action approval entity configuration information comprising at least one approval entity indication indicative of at least one approval entity and receiving, by the at least one computing system, at least one action request indicative of at least one first action to be performed by at least one action entity with respect to at least one computing resource. An approval entity may comprise a computing device associated with an approval personnel. An action entity may comprise a computing device associated with a user seeking to perform an action with respect to a protected computing resource or a protected computing service. The method may comprise directing, or transmitting, by the at least one computing system to the at least one approval entity, at least one action approval request comprising at least one action approval request indication indicative of at least one request for approval of the at least one first action indicated by the at least one action request. Responsive to the at least one action approval request, the method may comprise receiving, by the at least one computing system, at least one action acknowledgment comprising at least one action request acknowledgement corresponding to the at least one first action. Responsive to the at least one action acknowledgement, the method may comprise directing, or transmitting, to the at least one action entity, at least one first action approval indication indicative of a first permission to perform, by the at least one action entity, the at least one first action to result in at least one permitted first action. The method may comprise receiving, by the at least one computing system, an action confirmation request comprising at least one action confirmation request indication indicative of at least one request for confirmation of at least one second action and analyzing, by the at least one computing system, the at least one second action with respect to the at least one first action approval indication to result in at least one analyzed second action. Based on the at least one analyzed second action, the method may comprise directing, or transmitting, by the at least one computing system to the at least one computing resource, at least one second permission to perform the at least one second action.

In an example embodiment, responsive to the at least one action request, the method may comprise generating, by the at least one computing system, at least one action token. The method may comprise directing, or transmitting, by the at least one computing system to the at least one action entity, the at least one action token to be usable by the at least one action entity to facilitate performing the at least one first action with respect to the at least one computing resource and directing, or transmitting, by the at least one computing system to the at least one computing resource, the at least one action token to be usable by the at least one computing resource to facilitate determining, by the at least one computing resource, that the at least one analyzed second action and the at least one permitted first action are the same.

In an example embodiment, the method may further comprise determining, by the at least one computing system, that the at least one analyzed second action and the at least one permitted first action are different, wherein, based on the at least one analyzed second action and the at least one permitted first action being determined to be different, the at least one second permission to perform the at least one second action comprises a denial to perform the at least one second action.

In an example embodiment, the method may further comprise determining, by the at least one computing system, that the at least one analyzed second action and the at least one permitted first action are the same, wherein, based on the at least one analyzed second action and the at least one permitted first action being determined to be the same, the at least one second permission to perform the at least one second action comprises an approval to perform the at least one second action.

In an example embodiment, the at least one computing resource may comprises at least one of: at least one operating system, at least one action approval services Pod, at least one containerized application management system instance, at least one remote access controller, at least one storage component, at least one storage service, at least one cloud-based workload, at least one virtual machine instance, at least one authentication service object, at least one account associated with at least one application, or at least one account associated with at least one computing equipment hardware component.

In an example embodiment, at least one application specific interface may correspond to the at least one computing resource. The action approval entity configuration information may be usable by the at least one computing system to facilitate interfacing with the at least one computing resource.

In an example embodiment, the at least one action request may comprise at least one of: at least one action indication indicative of the at least one first action, at least one computing resource information indication indicative of the at least one computing resource, at least one computing resource identifier indicative of at least one computing resource identifier associated with the at least one computing resource, at least one action entity identifier indicative of the at least one action entity, or at least one action payload indication indicative of payload to be associated with the at least one first action.

In an example embodiment, the at least one computing system may be a first computing system. The at least one of the at least one approval entity may comprise at least one security service implemented by a second computing system.

In an example embodiment, the at least one of the at least one approval entity may comprise at least one user device, authenticated to be used by at least one user, identified by the action approval entity configuration information.

The at least one action request may be received via at least one management console associated with the at least one computing resource. The at least one computing system may comprise the at least one computing resource. The at least one computing system may be a first computing system and the at least one computing resource may correspond to a second computing system other than the first computing system.

In another example embodiment, a computing system may comprise at least one processor configured to process executable instructions that, when executed by the at least one processor, may facilitate performance of operations that may comprise receiving at least one action request indicative of a first action to be performed by at least one action entity with respect to at least one computing resource and directing, to at least one approval entity, at least one action approval request comprising at least one action approval request indication indicative of at least one request for approval of the first action. Responsive to the at least one action approval request, the operations may comprise receiving at least one action acknowledgment comprising at least one action request acknowledgement corresponding to the first action. Responsive to the at least one action acknowledgement, the operations may comprise directing, to the at least one action entity, at least one first action approval indication indicative of a first permission to perform, by the at least one action entity, the first action to result in a permitted first action. The operations may comprise receiving, from the at least one computing resource, an action confirmation request comprising at least one action confirmation request indication indicative of at least one request for confirmation of at least one second action and analyzing the at least one second action with respect to the at least one first action approval indication to result in at least one analyzed second action. Based on the at least one analyzed second action, the operations may comprise directing, to the at least one computing resource, at least one second permission to perform the at least one second action.

In an example embodiment, the at least one second action and the at least one first action approval indication may be determined to be different and the at least one second permission may be indicative that the at least one computing resource is to avoid performing the at least one second action.

In an example embodiment, the at least one second action and the at least one first action approval indication may be determined to be the same and the at least one second permission may be indicative that the at least one computing resource is to perform the at least one second action.

In an example embodiment, the computing system may be a first computing system and a second computing system may comprise the at least one computing resource.

In yet another example embodiment, a non-transitory machine-readable medium may comprise executable instructions that, when executed by at least one processor of at least one computing system, may facilitate performance of operations that may comprise receiving at least one action request indicative of a first action requested by at least one action entity to be executed with respect to at least one computing resource and directing, to at least one approval entity, at least one action approval request comprising at least one action approval request indication indicative of at least one request for approval of the first action. Responsive to the at least one action approval request, the operations may comprise receiving at least one action acknowledgment comprising at least one action request acknowledgement corresponding to the first action. Responsive to the at least one action acknowledgement, the operations may comprise directing, to the at least one action entity, at least one first action approval indication indicative of a first permission with respect to performing the first action.

In an example embodiment, the at least one first action approval indication is indicative of the first permission being a denial of permission to perform the first action. In an example embodiment, the at least one first action approval indication may be indicative of the first permission being a granting of permission to perform the first action. The operations may further comprise receiving, from the at least one computing resource, an action confirmation request comprising at least one action confirmation request indication indicative of at least one request for confirmation of approval to perform at least one second action and analyzing the at least one second action with respect to the at least one first action approval indication to result in at least one analyzed second action. Based on the at least one analyzed second action being determined to be the same as the first permission being the granting of permission to perform the first action, the operations may further comprise directing, to the at least one computing resource, at least one second permission indicative that the at least one computing resource has been approved to perform the at least one second action.

In an example embodiment, the at least one first action approval indication may be indicative of the first permission being a granting of permission to perform the first action. The operations may further comprise receiving, from the at least one computing resource, an action confirmation request comprising at least one action confirmation request indication indicative of at least one request for confirmation of approval to perform at least one second action and analyzing the at least one second action with respect to the at least one first action approval indication to result in at least one analyzed second action. Based on the at least one analyzed second action being determined to be different than the first granting of the first permission, directing, to the at least one computing resource, at least one second permission indicative the at least one computing resource has been denied to perform the at least one second action.

BRIEF DESCRIPTION OF THE DRAWINGS

FIG. 14 illustrates a table of example privileged action approval system application programming interfaces.

FIG. 15 illustrates example privileged actions.

FIG. 17 illustrates example privileged actions according to an account protection mode embodiment.

DETAILED DESCRIPTION OF THE DRAWINGS

Figure 1:
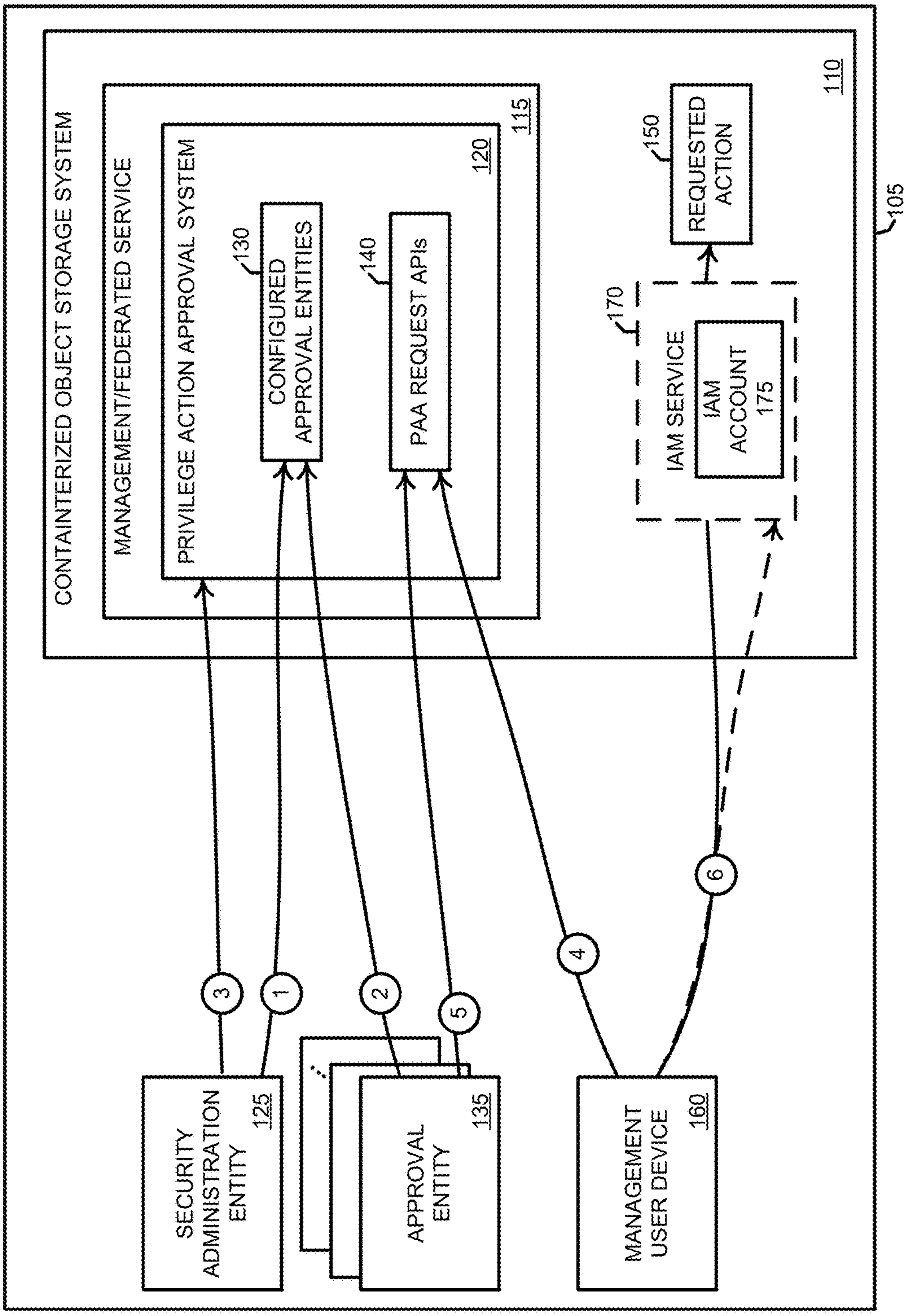
FIG. 1 illustrates an example computing environment to approve requested computing actions.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms “component,” “system” and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

A monitor service may monitor components, resources, or workloads in a hybrid computing system environment. The monitor service can run on a SmartNIC or iDRAC or iSM or VxRail Manager or OpenBMC or any such controller of the computing system. The monitoring service may be one of multiple monitoring service with some of the services acting as clients of a master of the monitoring services, which master may act as a main interface for the others with respect to the computing system, such as may be used in a computing environment that comprises clusters.

Various actions within, or taken with respect to, a computing system may be deemed as "high risk" and thus may be deemed as 'privileged.' A computing system action may be deemed as privileged if running, executing, or performing the action may result in serious irreparable harm to the computing system or to a computing resource associated therewith. One example of an action that may be deemed privileged may comprise deleting or overwriting a director of files stored on a storage resource. It is desirable to prevent misuse of privileged actions by a bad actor, such as an insider threat, by an innocuous human who makes a mistake, or by a malicious hacker.

With conventional techniques, an administrator of a computing system may have complete root access to the computing system and may be able to intentionally, or inadvertently, circumvent security controls with respect to a resource associated with the computing system.

To solve the problem of an accidental or intentional action being performed with respect to a protected computing resource, such as a protected platform, a protected computing component, or a protected computing service, that may cause a level of harm to the resource, or associated resources, that has been deemed unacceptable, embodiments disclosed herein may facilitate delegating approval to perform or execute privileged actions with respect to a computing system, or with respect to a computing system resource, to an independent approval entity that does not have administrative or data access to the computing system or the computing system resource. For example, an authorized management user may desire to change a default retention policy with respect to objects in a locked down account. According to embodiments disclosed herein, a privileged action approval may be required before the authorized management user can perform, or execute, the change to the default retention policy. In another example, to perform escalation of privilege to perform an action with respect to one or more locked down platform nodes, approval by an approval entity to perform the escalation by members of a technical support team may be required.

According to embodiments disclosed herein, privileged actions may be defined and at least one approval entity may be configured or set up via a privileged action approval system ("PAAS") before enabling the PAAS to manage at least one approval to perform a privileged action (e.g., a privileged action approval or "PAA"). When an authorized user initiates, or requests, performing of a privileged action (e.g., a user authorized to use a computing resource with respect to which a privileged action may be directed or requested), a PAA request may be generated and submitted to the PAAS. An approval entity corresponding to the PAAS may validate the PAA request and approve or reject the PAA request. If a PAA request is approved, a computing system component corresponding to the authorized user may obtain a temporary privilege token to facilitate performing the requested protected action with respect to the computing resource. Embodiments disclosed herein may facilitate protecting a variety of computing resources with respect to both a control path and a data path corresponding to a computing system.

Embodiments disclosed herein may facilitate preventing a bad actor from acting maliciously with respect to a computing resource. Embodiments disclosed herein may facilitate configuring different privileged actions for different computing services or resources. Embodiments disclosed herein may facilitate a computing resource being configured to require one or more approvals for a privileged action to be taken with respect to the resource. Embodiments disclosed herein may facilitate automatic or manual execution of approval of requests to take privileged action. To facilitate implementing a PAAS to prevent or to minimize accidental or intentional use of a computing system resource that may cause harm to the resource or the system corresponding thereto, the PAAS may be configured and enabled with respect to a computing system, such as an enterprise computing system, with respect to one or more computing system(s) facilitated by a data center, or with respect to one or more virtual computing system(s). Configuring of a PAAS may comprise importing customized configuration information to a computing system that may be facilitating the PAAS. Configuring of the PAAS may comprise establishing at least one approval entity that may be used to facilitate approving an action request. A PAAS may be enabled by a security administration entity. As used herein, the term 'entity' may refer to a computing device, or computing system, that is accessible and being used by a user having authority, or authentication credentials corresponding thereto, to perform a function corresponding to the entity. In some example embodiments disclosed herein, an entity may operate automatically based on configuration information and criteria that may be configured for use by the entity to determine whether to authorize, authenticate, approve, use, or otherwise perform a protected action.

Turning now to the figures, FIG. 1 illustrates an example computing environment 100 comprising at least one computing system 105 usable to approve requested computing actions, for example deleting of a directory, folder, drive, volume, moving a directory, folder, drive, volume, or other action that could have serious negative effects on information or data stored on containerized object storage system 110. Containerized object storage system 110 may use container technology within a container orchestration system that may facilitate providing application processes as services, or micro services.

At act 1, security administration entity 125 may import customized configuration information to PAAS 120. The imported customized configuration information may configure, or set up, approval entities 130 in PAAS system 120. Approval entity/entities 130 is 130 configured in PAAS 120 make comprise, for example, approval entity 135 and other approval entities. Approval configuration information configured at act 1 may comprise approval process definitions/rules. Approval configuration information configured at act 1 may comprise at least one defined privileged action, or a set of actions, based on a privileged action template. Approval configuration information configured at act 1 may comprise a defined minimum number/criterion of approvals required for a configured privileged action. Approval configuration information configured at act 1 may comprise information to enable automatic request approval functionality for at least one PAA request. Trust between security administration entity 125 and approval entity 135 may be established based on authentication credentials associated with the administrative entity and the approval entity being acknowledged or established. Thus, security administration entity 125 may have established a trust relationship with approval entity 135.

At act 2, each of one or more approval entities 135 may register with PAAS 120 by causing a password corresponding to the approval entity, or corresponding to a user authorized to use the approval entity configured at act 1. Administration entity 125 may create approval entity/entities 135 in PAAS, wherein each approval entity 135 may complete registration by resetting a password corresponding to the approval entity.

Security administration entity 125 may acknowledge or approve configured approval entities configured via, and indicated by, configuration information 130 at act 3. At act 4, management user device 160, which may be operated by a management user, for example, an IT technician, may request performance of a privileged action with respect to a resource or service corresponding to containerized object storage system 110. At act 5, approval entity 135 may grant, or deny, permission for management device 160 to perform the requested privileged action. At act 6, if approval entity 135 grants permission to management user entity 160 to perform the requested privileged action, at act 6 management user entity 160 may perform the requested action 150. In an embodiment, the requested action may correspond to updating or making a change to an identity account 175, for example, an IAM account facilitated by IAM service 170. If operation of PAAS 120 has been enabled for protection mode, resource/service 115 may create a PAA request on behalf of management user device 160 and then may generate a rejection of the request wherein the rejection comprises a PAA request ID corresponding to the request to perform a privileged action 150. In an example embodiment, an update to PAAS configuration information 130 after PAAS is enabled may require approval by approval entity 135.

Approval entity 135 may facilitate an approval role and may not be able to facilitate any other management role. PAAS 120 may monitor uniqueness of approval entity/entities 135 and registration status corresponding thereto. PAAS 135 may generate audit logs with respect to PAAS activities and may generate and transmit to, for example, to security management entity 125, warnings on notifications after detecting concerns related to an action managed by the PAAS. In an example embodiment, security administration entity 125 may require at least two approval entities 135 to complete registration at act 2 before PAAS 125 is enabled.

Figure 2:
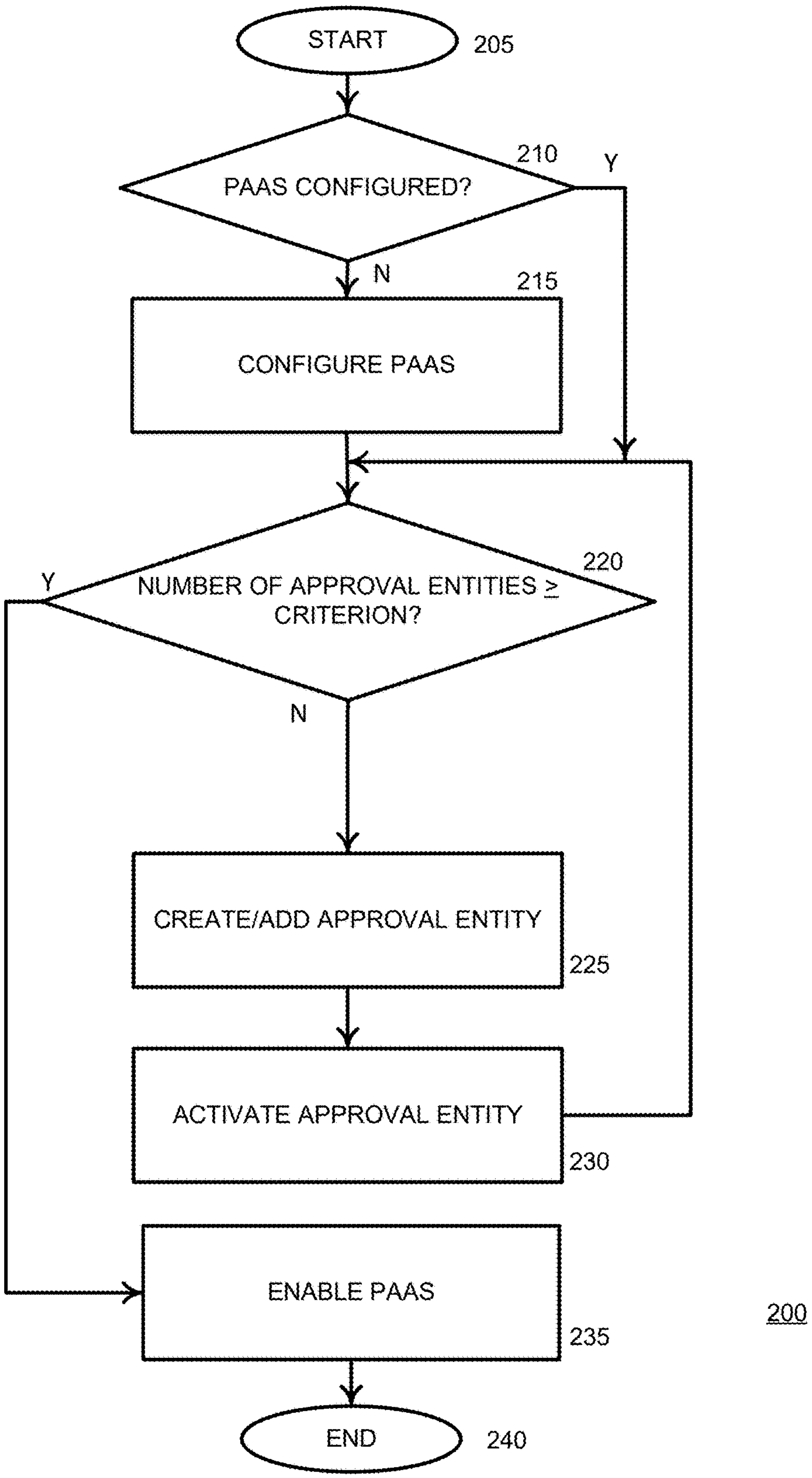
FIG. 2 illustrates a flow diagram of an example method to configure and enable an approval entity.

Turning now to FIG. 2, the figure illustrates a flow diagram of an example method 200 to configure and enable an approval entity (e.g., entity 135 shown in FIG. 1) to be used with PAAS 120. Continuing with description of FIG. 2, a determination may be made at act 210 whether PAAS 120 has been configured. If a determination is made at act 210 that PAAS 120 has not been configured, method 200 may advance to act 215 and configure the PAAS. Configuring PAAS 120 may comprise uploading configuration information indicative of at least one protected service and at least one privileged action associated therewith. The configuration information may be indicative of payload associated with a privileged action that may be requested by an entity 160, for example, a requested action may comprise deleting a folder and a payload indication may be indicative of a folder stored by storage system 115 to be deleted based on the indicated requested delete action. If a determination is made at act 210 that PAAS 120 has been configured to operate, or to be implemented, with respect to a service or resource 115, method 200 may advance from act 210 to act 220.

Regardless of whether PAAS 120 is configured at act 215, at act 220 a determination may be made whether a number of approval entities 135 have been configured for use with respect to a service or resource 115. If a determination is made that at least one criterion, comprising a number of approval entities required to approve changes to a particular resource 115, has been configured, method 200 may advance to act 235 and PAAS 120 may be activated, or enabled, for use with respect to the particular resource and method 200 may advance to act 240 and end.

Returning to description of 220, if a determination is made that a number of approval entities does not equal or exceed a criterion, which criterion may be specified by security administration entity 125, method 200 may advance to act 225. At act 225, an approval entity 135 may be created or added to a number of approval entities already configured for use by PAAS 120 to approve privileged actions with respect to protected service or resource 115. At act 230, an approval entity 135, created or added at act 225, may be activated and method 200 may return to act 220.

Figure 3:
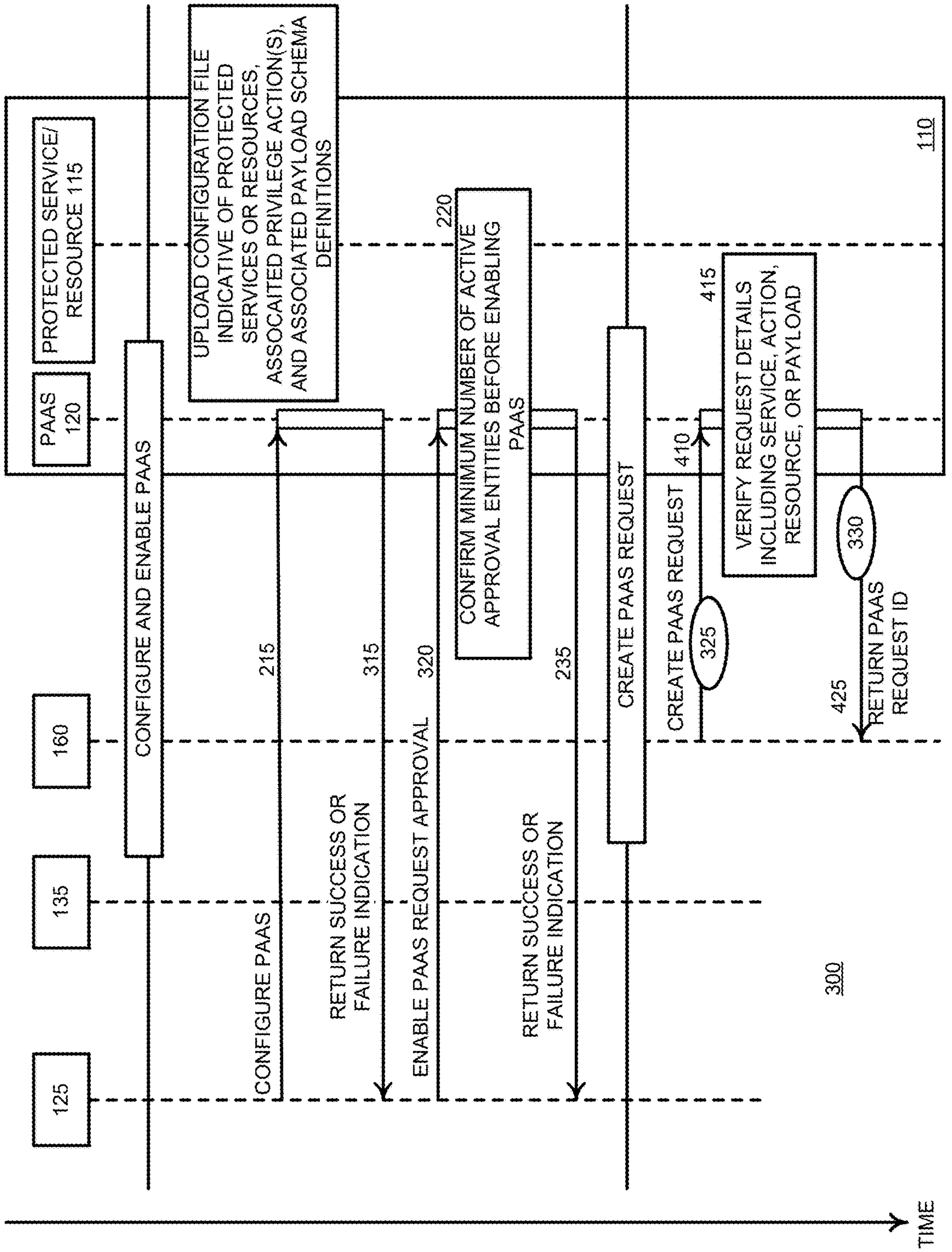
FIG. 3 illustrates a timing diagram of an example method to configure and enable an approval entity and generate a privileged action approval system request.

FIG. 3 illustrates a timing diagram of an example method to configure, and to request approval by, an approval entity. At act 215, a security administration entity 125 may configure PAAS 120 as described in reference to FIGS. 1-2. Configuring of PAAS 120 may comprise uploading a configuration file comprising configuration information that may be indicative of protected services or protected resources, for example services 115 illustrated in FIG. 1. The configuration information uploaded at act 215 may comprise at least one indication of at least one privileged action associated with the protected service or resource and the configuration information uploaded at act 215 may comprise payload schema definitions, or payload information, associated with the privileged action(s) or associated with the protected services or resources. At act 315, PAAS 120 may return to, security administration entity 125, an indication of configuration of the PAAS being successful or unsuccessful as described in reference to at least act 220 illustrated in FIG. 2. Accordingly, entity 125 may be apprised of successful configuration of PAAS 120 with respect to at least one protected service or resource 115.

At act 320, entity 125 may enable request approval by PAAS 120 with respect to at least one protected service or resource 115. As described in reference to act 220 illustrated in FIG. 2, PAAS 120 may determine, or confirm, that a minimum number of approval entities 135 have been configured with respect to a particular protective service or resource 115 according to configuration information indicated at act 215. At act 235, PAAS 120 may indicate to entity 125 that PAAS 120 has been successfully enabled based on a minimum number of approval entities 135 having been configured with respect to a particular protected service or resource 115. An indication of successful configuration of PAAS 120 with respect to a particular protected service or resource 115 may be indicative that a minimum number of approval entities 135 have been configured with respect to the particular protected service or resource. PAAS 120 may indicate to entity 125 that a configured minimum number of approval entities have not been configured and activated with respect to the particular protected service or resource. Thus, a failure indication may be transmitted or directed to entity 125 that is indicative that PAAS 120 has not been successfully enabled with respect to the particular protected service or resource 115.

Figure 4:
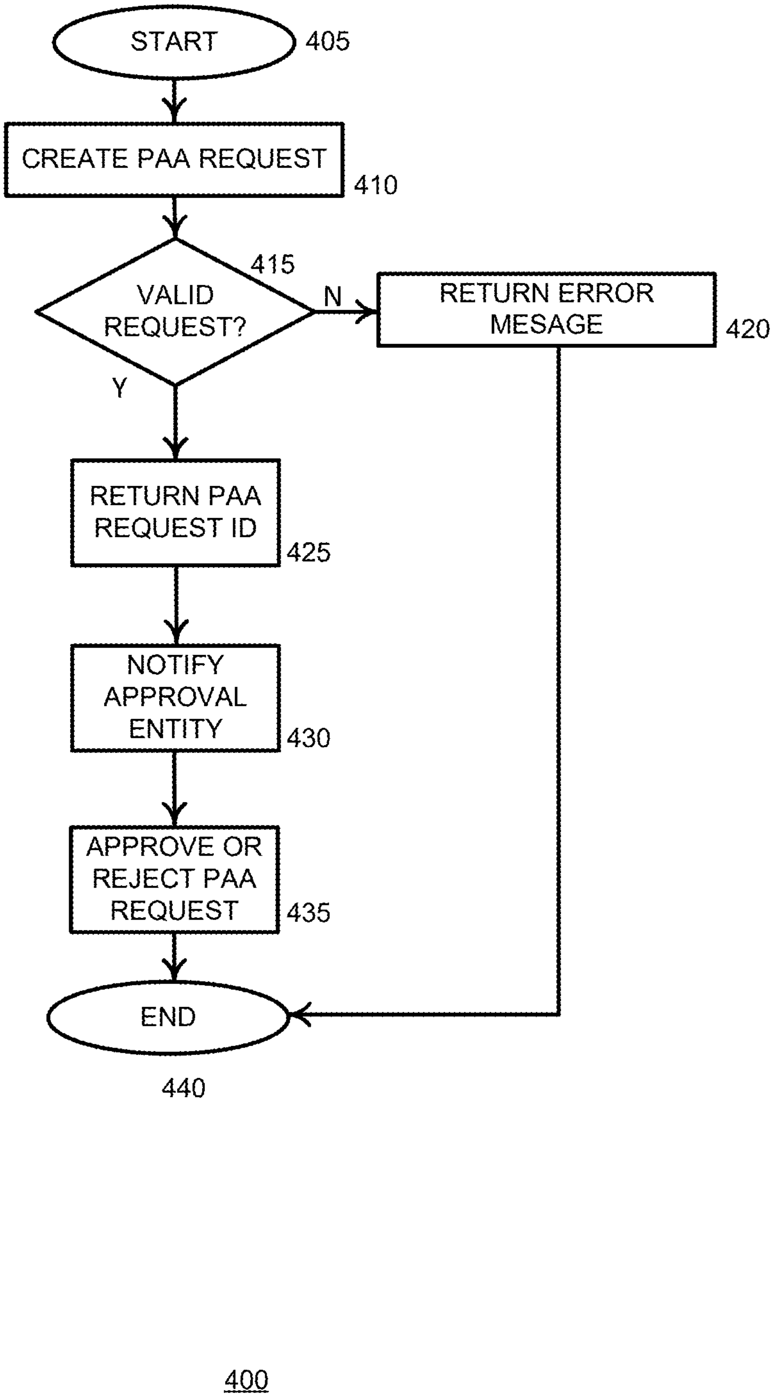
FIG. 4 illustrates a flow diagram of an example method to validate an action request.

At act 410, as described in reference to FIG. 4, a user entity 160, or a computing device corresponding thereto, may generate, and may transmit or direct to PAAS 120, a privileged action approval request 325 that requests performance or execution, with respect to a protected service or resource 115, an action that may be deemed as a privileged action, and that may have been configured via configuration information configured to PAAS 120 at act 215. At act 415, PAAS 120 may verify that an action requested by a request matches, is the same as, or otherwise satisfies, configuration information uploaded at act 215 with respect to the privileged action and the protected resource or service 115. If PAAS 120 verifies that an action requested by request 325 at act 410 satisfies configuration information corresponding to a protected service or resource 115, at act 425 PAAS 120 may transmit to user entity 160 a request confirmation message that may comprise at least one request identifier 330 corresponding to request 325.

FIG. 4 illustrates a flow diagram of an example method 400. Method 400 starts at act 405 and may facilitate validation of action request 325 generated at act 410 illustrated in FIG. 3. If a determination is made that request 325 does not satisfy configuration information configured into a PAAS 120 at act 215 as described in reference to FIG. 2, method 400 may return an error message to user entity 160 and end at act 440.

Returning to description of act 415, if PAAS 120 determines that a request 325 satisfies configuration information configured into PAAS 120, method 400 may advance to act 425. At 425, PAS 120 may return, to user entity 160, request identifier 330 corresponding to request 325. At act 430, PAAS 120 may notify approval entity 135, illustrated in FIG. 3, that request 325 has been validated. At act 435, approval entity 135 may approve or reject request 325 transmitted by user entity 160 PAAS 120 at act 410 and method 400 may advance to act 440 and end.

Figure 5:
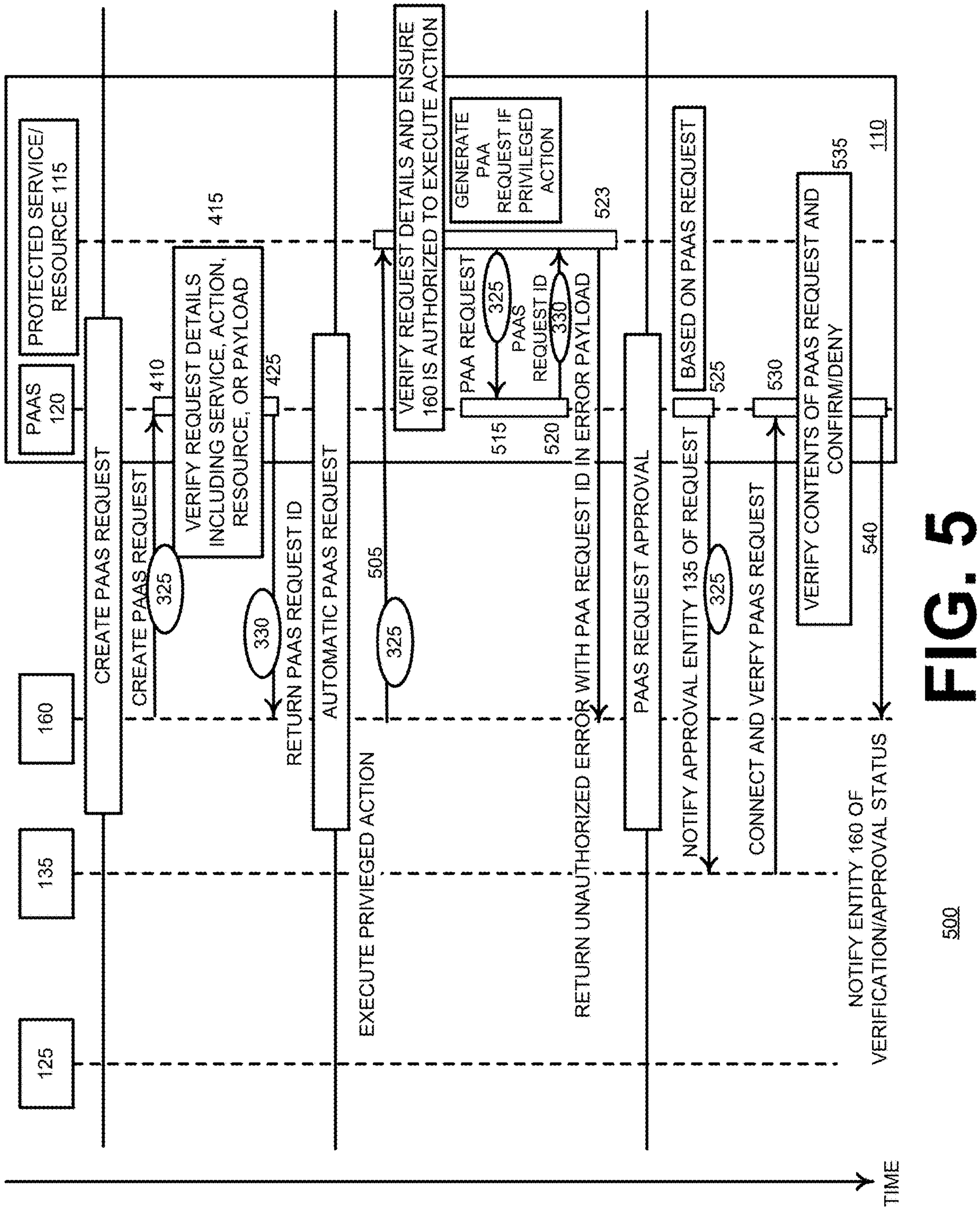
FIG. 5 illustrates a timing diagram of an example method to validate an action request.

FIG. 5 illustrates a timing diagram of an example method to validate an action request 325. After receiving a PAS request ID 330 at act 425, user entity 160 may generate and transmit or direct, to protective service or resource 115, action request 325 at act 505. Protected service or resource 115 may operate with PAAS 120 to verify that request details indicated in request 325 are authorized to be performed by user entity 160. At act 515, protected service or resource 115 may transmit or direct to PAS 120 request 325 received at act 505. Responsive to receiving request 325 at act 515, PAAS 120 may transmit request identifier 330 to the protected service or resource at act 520. At act 523, the protected service or resource 115 may transmit to user entity 160 a message, which may be an error message, indicative that request 325 has not yet been approved for execution. At act 525, based on having received a request 325 at act 515, PAAS 120 may transmit, to approval entity 135, request 325, or information indicated thereby. At act 530, approval entity 135 may connect with PAAS 120 and transmit or direct, to the PAAS, an approval that user entity 160 is approved to perform an action indicated by request 325. Based on receiving an approval at act 530, PAAS 120 may determine at act 535 that a request to perform an action by user entity 160 with respect to protective service or resource 115 has been approved by approval entity 135 and the PAS may transmit to user entity 160 an indication that an action requested via request 325 has been approved by approval entity 135. In an embodiment, PAAS 120 may determine at act 535 that an action requested via request 325 is not approved by approval entity 135, and consequently may transmit at act 540 an indication that an action requested by request 325 has been denied.

Figure 6:
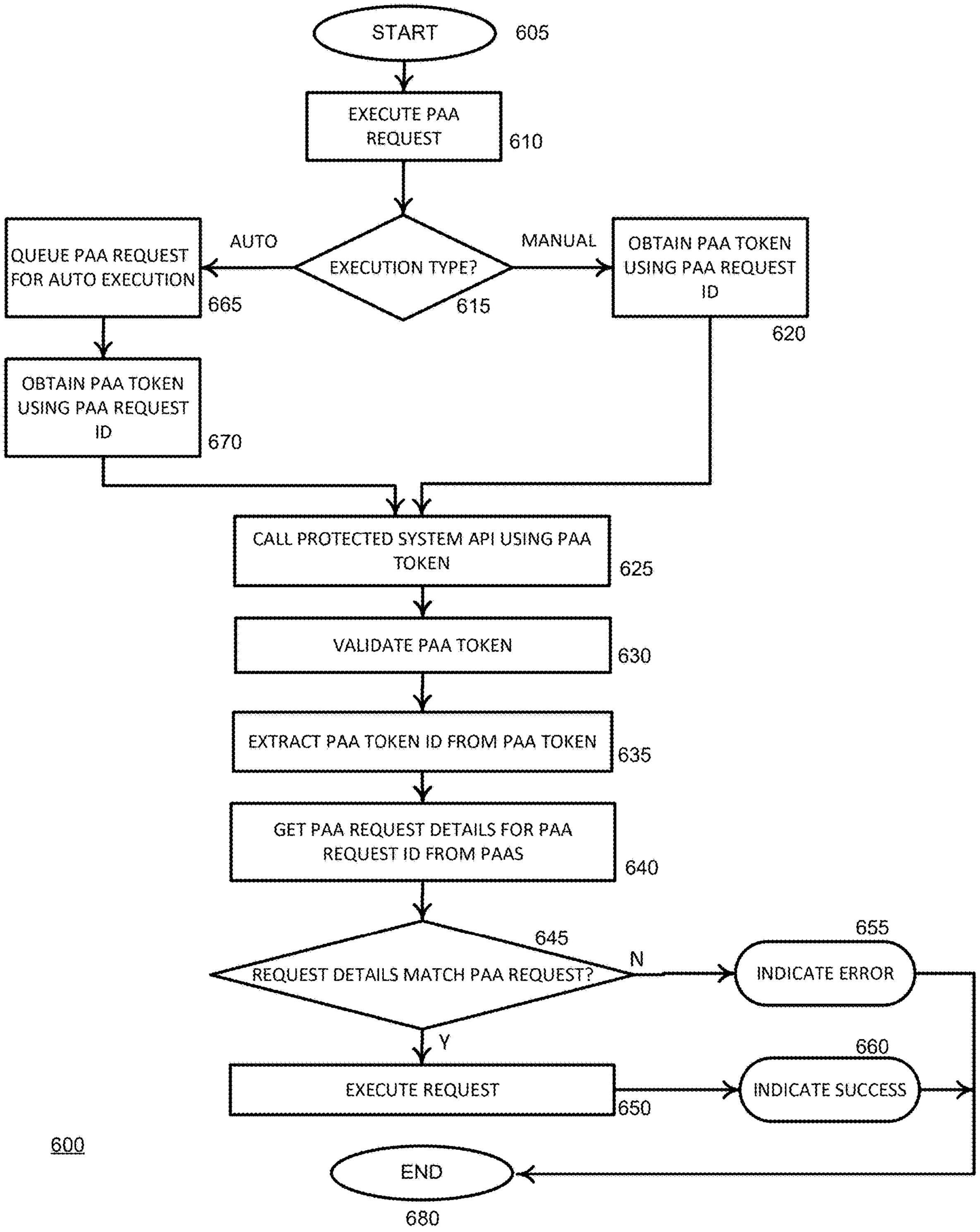
FIG. 6 illustrates a flow diagram of an example method to approve an action request.

FIG. 6 illustrates a flow diagram of an example method 600 to approve an action request, such as action request 325 described in reference to FIG. 3. Method 600 begins at act 605. At act 610, a user entity, for example user entity 160, may direct, to a protected service or resource 115, a request to perform a privileged action with respect to the protected service or resource as described in reference to act 505 illustrated in FIG. 5. User entity 160 may determine that PAAS 120 has notified the user entity that an action requested by request 325 has been approved by approval entity 135 as described in reference to acts 535 and 540 illustrated in FIG. 5. Continuing with description of FIG. 6, at act 610 PAAS 120 may determine that at least one approval entity has approved execution of a privileged act requested by request 325 and at act 615 may determine whether execution of a requested action is to be accommodated according to an automatic mode or according to a manual mode. If a determination is made that execution of a privileged action requested by request 325 is to be performed or executed according to a manual mode, method 600 may advance to act 620. At act 620, user entity 160 may request a privileged action approval token by transmitting a message comprising privileged action approval request identifier 330 to PAAS 120. Responsive to receiving a request for a privileged action approval token, PAAS 120 may direct a privileged action approval token to user entity 160 and method 600 may advance to act 625.

Returning to description of act 615, if a determination is made that an action requested via request 325 is to be performed according to an automatic mode, instead of generating a privileged action approval token based on request identifier 330 and directing the privileged action approval token to user entity 160 based on having received identifier 330, at act 665 PAAS 120 may queue request 325 and may generate a privileged action approval token and may automatically direct the token to user entity 160 at act 675. Method 600 may advance from act 670 to act 625.

At act 625, the privileged action approval token may be used to call an application programming interface corresponding to a protected action indicated or requested by request 325. If a requested privileged action is to be performed according to a manual mode, user entity 160 may call the protected application programming interface corresponding to a requested privileged action at act 625. If s requested privilege action is to be performed according to an automatic mode, PAAS 120 may cause the protected application programming interface corresponding to the requested privileged action at act 625. At act 630, the privileged action approval token may be validated by PAAS 120 by extracting request identifier 330 from the token, determining, at act 640, information associated with request 325 based on the request identifier, and determining, at act 645, whether the privileged action application programming interface called at act 625 matches, or satisfies, information associated with request identifier 330. If a determination is made at act 645 that the privileged action requested by request 325 that may be called at act 625 does not match, or satisfy, privileged action information corresponding to request identifier 330, method 600 may advance to act 655 and indicate to user entity 160 an error with respect to request 325. If a determination is made at act 645 that the privileged action requested by request 325 that may be called at act 625 matches, or satisfies, privileged action information corresponding to request identifier 330, method 600 may advance to act 660 and indicate to user entity 160 that a privileged action requested by request 325 has been successfully performed method 600 may advance to act 680 and end.

Figure 7:
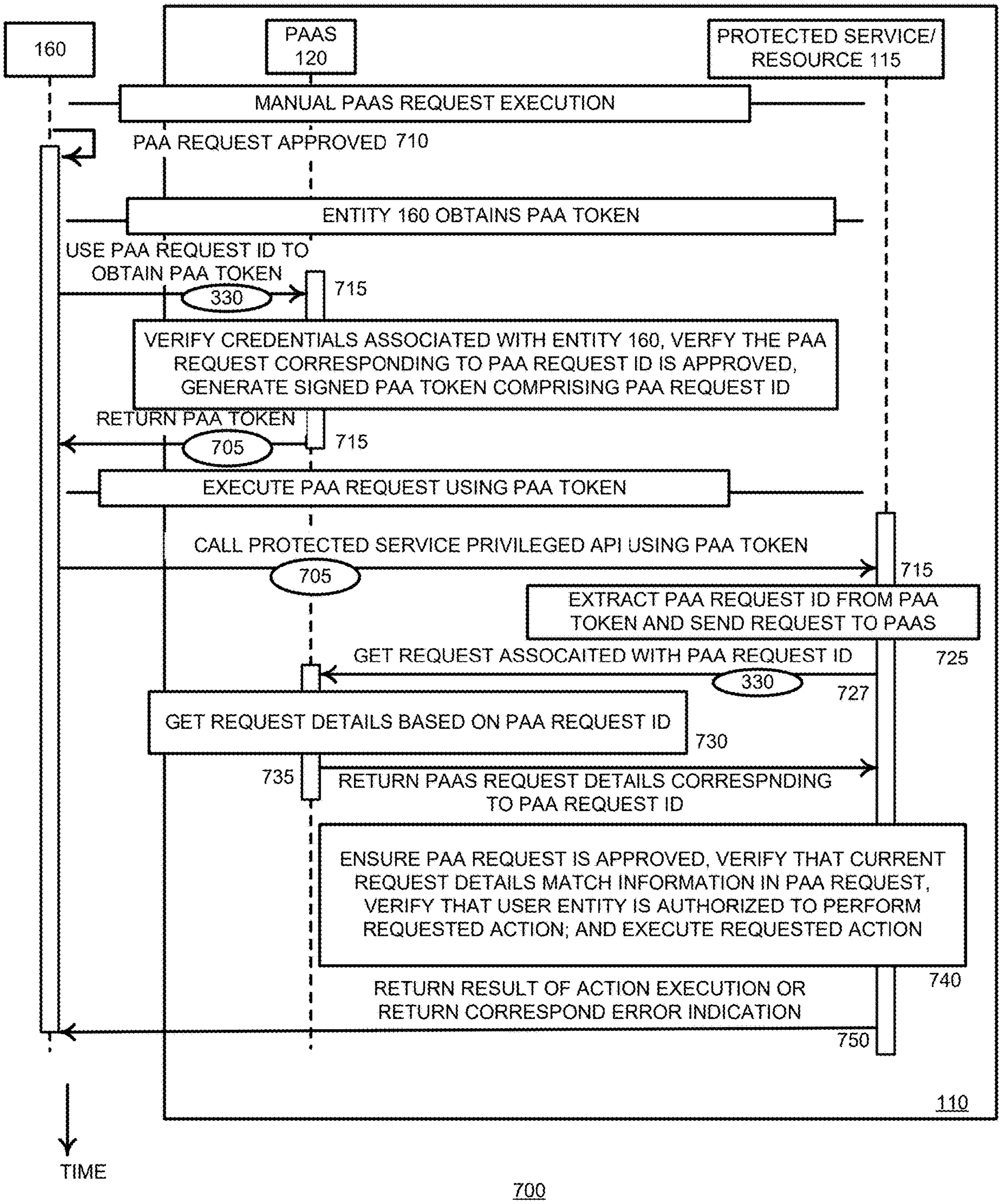
FIG. 7 illustrates a timing diagram of an example method to manually execute an approved requested privileged action.

FIG. 7 illustrates a timing diagram of an example method to manually perform a privileged action requested by an action request, for example request 325. At act 710, based on having received an indication at act 540 illustrated in FIG. 5 that a privilege action indicated by request 325 have been approved by approval entity 135, user entity 160 may determine that a privileged action requested by request 325 has been approved. At act 715, user entity 160 may direct to PAAS 120 a request for a privileged action approval token. The request for the privileged action approval token may comprise request identifier 330. At act 717, PAAS 120 may verify credentials associated with entity 160, verify that the privileged action approval request 325 corresponding to request identifier 330 has been approved by an approval entity, and may generate a signed privileged action approval token 705 that may comprise request identifier 330. At act 720, PAAS 120 may direct, or return, token 705 generated at act 717 to user entity 160. At act 720, user entity 160 may direct a privileged action call request to protected service or resource 115. The request directed to service or resource 115 at act 720 may comprise token 705. At act 725, protected service or resource 115 may extract request identifier 330 from token 705 and at act 727 may direct a request to perform a privileged action requested via request 325 to PAAS 120. Based on request identifier 330 received at act 727, at act 730, PAAS 120 may determine information associated with a privileged action requested via request 325. At act 735, PAAS 120 may direct information determined at act 730 to protected service resource 115. At act 740, protected service resource 115 may determine that a privileged action indicated in request 325 has been approved by at least one approval entity, for example at least one approval entity 135, based on determining that information received at 735 matches, or satisfies, information indicated in request 325. At act 740, protected service or resource 115 may also verify that user entity 160 is authorized to perform a privileged action indicated in request 325, and based on determining that request 325 has been approved and that user entity 160 is authorized to perform the approved request, protected service resource 115 may execute a privileged action indicated in request 325. At act 745, protected service resource 115 may direct to user entity 160 an indication indicative that a privileged action requested via request 325 has been successfully performed or that an error has occurred with respect to performing the privileged action, which error may be based on a determination of act 740 that the privileged action has not been approved by an approval entity 135 or that user entity 160 is not authorized, with respect to protected service or resource 115, to have the privileged action performed by the protected service or resource.

Figure 8:
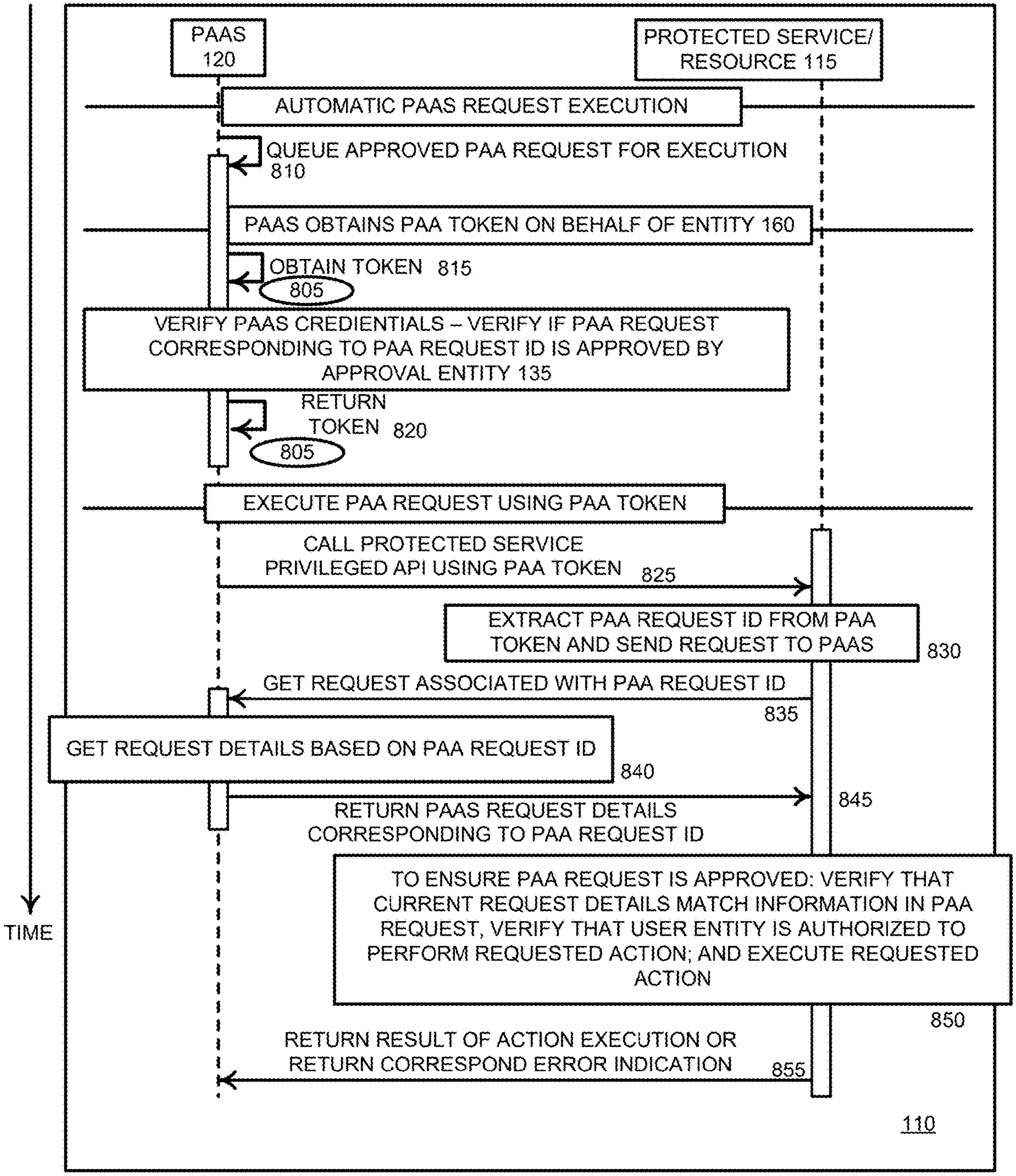
FIG. 8 illustrates a timing diagram of an example method to automatically execute an approved requested privileged action.

FIG. 8 illustrates a timing diagram of an example method to automatically perform a privileged action requested by an action request, for example request 325. In an example embodiment illustrated in FIG. 8, PAAS 120, upon determining that execution of a privileged action requested via a request 325 has been approved by an approval entity, at act 810 the PAAS may queue a privileged action request corresponding to the privileged action that has been approved for execution. At act 815, PAAS may obtain, or determine, token 805 based on a request identifier 330 that may have been generated at act 520 described in reference to FIG. 5. At act 820, PAAS 120 may determine, based on identifier 330, whether a privileged action requested via request 325 has been approved by an approval entity 135. After determining that a privileged action requested via request 325 has been approved by an approval entity 135, PAAS 120 may return token 805.

At act 825, PAAS 120 may call, using token 808, an application programming interface corresponding to a privileged action requested via request 325. At act 830, protected service or resource 115 may extract request identifier 330 from token 808 and may direct, to PAAS 120 at act 835, a request associated with the request identifier. At act 840, PAS 120 may determine information corresponding to a privileged action requested via request 325 based on request identifier 330. At act 845, PAAS 120 may direct to protected service or resource 115 information corresponding to a privileged action associated with request identifier 330. At act 850, protected service resource 115 may determine that a privileged action indicated at 845 matches, or satisfies, information associated with request 325 and the protected service or resource may verify that a user entity that is requesting the privileged action is authorized to perform the requested privileged action. Based on determining that the user entity that is requesting the privilege to action is authorized, with respect to the protected service or resource 115 to have the privileged action performed, and that execution of the privileged action has been approved by at least one approval entity 135 (e.g., execution of the privileged action has been approved by a minimum number of approval entities as configured by security administration entity 125, at act 855 the protected service or resource 115 may direct, to PAAS 120, an indication that the requested privileged action has been successfully executed, or, if at 850 the protected service or resource 115 determines that either a user entity requesting the privileged action is not authorized with respect to the protected service or resource to have the privileged action executed, or that an approval entity has not approved you requested privileged action (e.g., information received at act 845 associated with a requested privilege action does not satisfy, or match, information corresponding to request identifier 330) the protected service or resource may direct to the PAAS an error indication indicative that the privileged action has not been executed.

Figure 9:
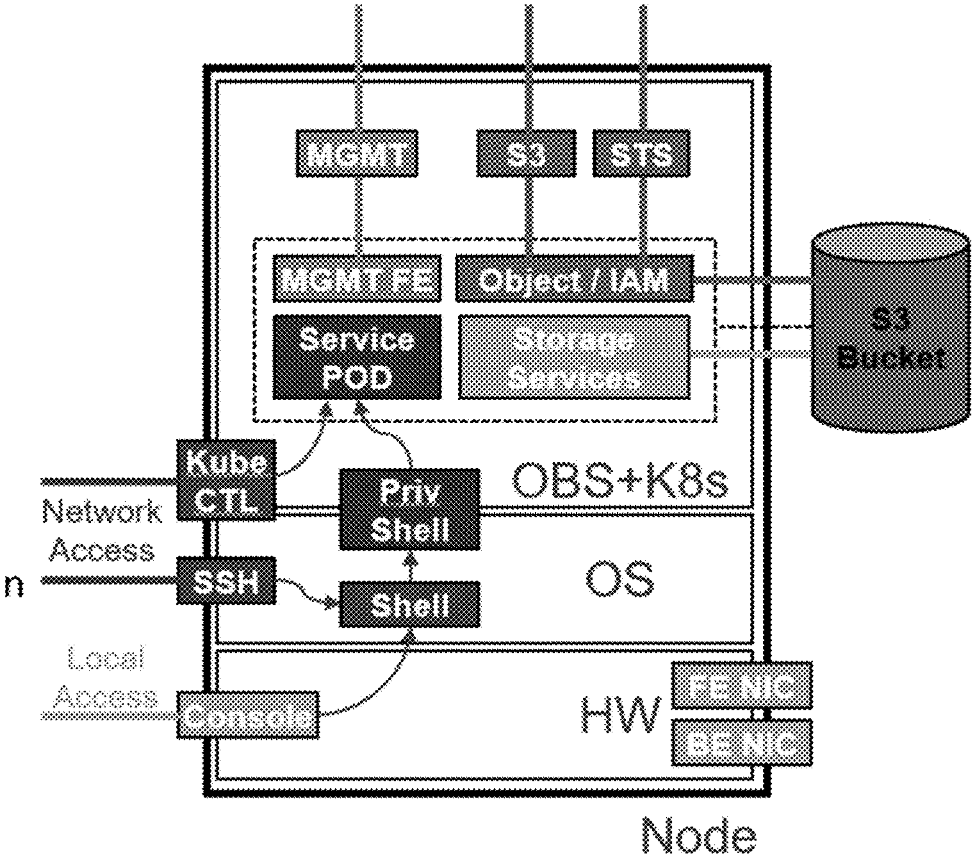
FIG. 9 illustrates example computing resources.

FIG. 9 illustrates example computing resources or computing platforms, or components thereof, that may be protected, for example by a PAAS.

Turning now to FIG. 14, the figure illustrates privileged action information 1400 comprising in column 1405 examples of privileged action application programming interface information corresponding to privileged actions that may be approved by a PAAS and corresponding descriptions of the example privileged actions our respectively listed in column 1410. Configuration information that may be configured by security administration entity 125, as shown in FIG. 1, and that may be configured to PAAS 120 at act 215 illustrated in FIG. 2, may comprise information 1400. Column 1415 may comprise, for each privileged action indicated in column 1405, one or more approval entities 135 that may be required to approve the corresponding privileged action respectively indicated in column 1405. For example, a DELETE privileged action indicated in field 1405F may require three approval entities 135, which may be indicated in field 1415F, to approve a user entity 160 performing the privileged action indicated in field 1405F whereas a GET privileged action indicated in field 1405B may only require two approval entities, or even just one approval entity, which may be indicated in field 1415B.

In the example shown in FIG. 14, privileged actions indicated by column 1405 may pertain to actions that may be performed with respect to PAAS 120. FIG. 15 indicates in column 1510 examples of privileged actions that may pertain to protected platforms or resources other than just PAAS 120, as respectively indicated in column 1505.

Figure 16:
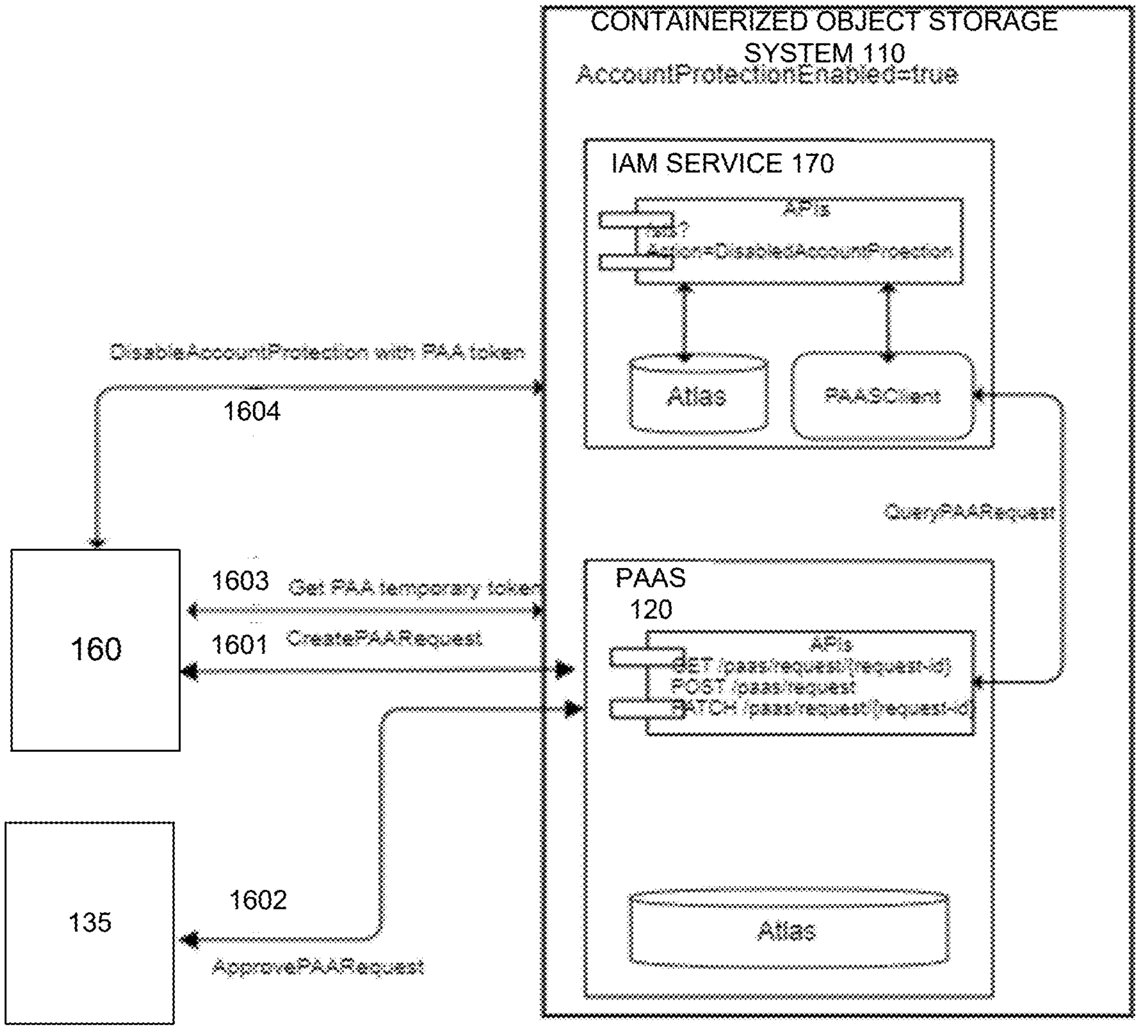
FIG. 16 illustrates an example embodiment to approve changes to an account protection according to an account protection mode embodiment.
Figure 18:
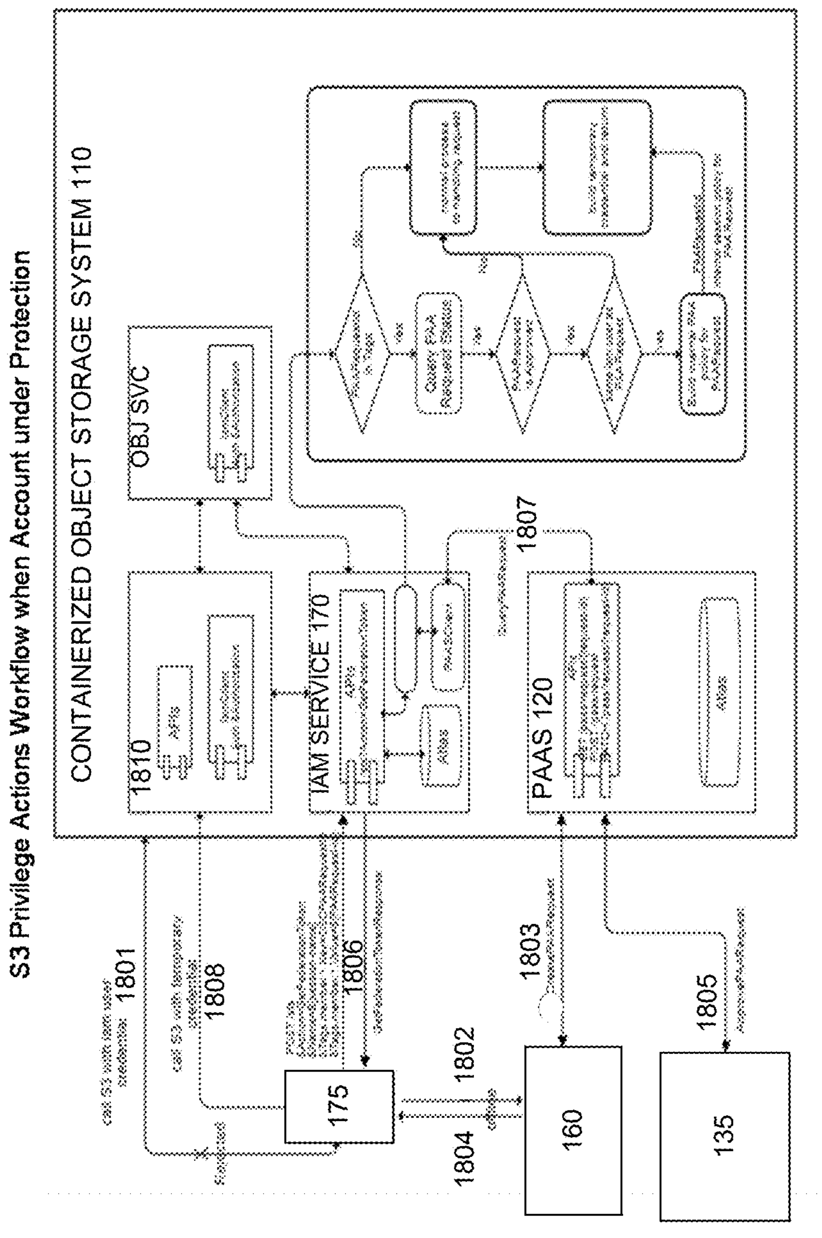
FIG. 18 illustrates an example privileged action workflow diagram according to an account protection mode.

Turning now to FIG. 16, the figure illustrates an example embodiment wherein the protected resource comprises IAM service 170. At act 1601, user entity 160 may generate a privileged action approval request, for example request 325, as described elsewhere herein. At acts 1602, PAAS 120 may obtain approval by approval entity 135 with respect to the request generated at act 1601 and received from user entity 160. At act 1603, user entity 160 may receive a privileged action approval token, which may be temporary or which may have a configured expiration time, to be used to facilitate execution of a privileged action, requested at act 1601, being executed with respect to IAM service 170 at 1604. In example embodiment 1600, the privileged action requested with respect to IAM service 170 may correspond to disabling account protection, or disabling an account protection mode. FIG. 17 illustrates in column 1710 privileged actions, and in column 1715 application programming interface information respectively corresponding thereto, that may be executed with respect to protected services or protected resources indicated in column 1705 during an account protection mode. FIG. 18 illustrates IAM user entity 175 attempting to request a privileged action with respect to protected resource 1810. At act 1802, IAM user entity 175 may request that user entity 160 request, at act 1803, that PAAS 120 facilitate the privileged action requested at act 1801. At act 1803, user entity 160 may direct, to PAAS 120, a request for the privileged action requested at act 1801, and at act 1804 user entity 160 may indicate to IAM user entity 175 that user entity 160 has requested approval of the privileged action. At act 1805, PAAS 120 may obtain approval of the privileged action from approval entity 135. At act 1806, IAM entity 175 may receive a token indicative that the requested privileged action has been approved based on PAAS 120, at act 1807, indicating to IAM service 170 that approval entity 135 has approved execution of the privileged action requested by IAM user entity 175. At act 1808, IAM entity 175 may use the token received at act 1806 to invoke execution of the privileged action requested to at act 1801.

Figure 10:
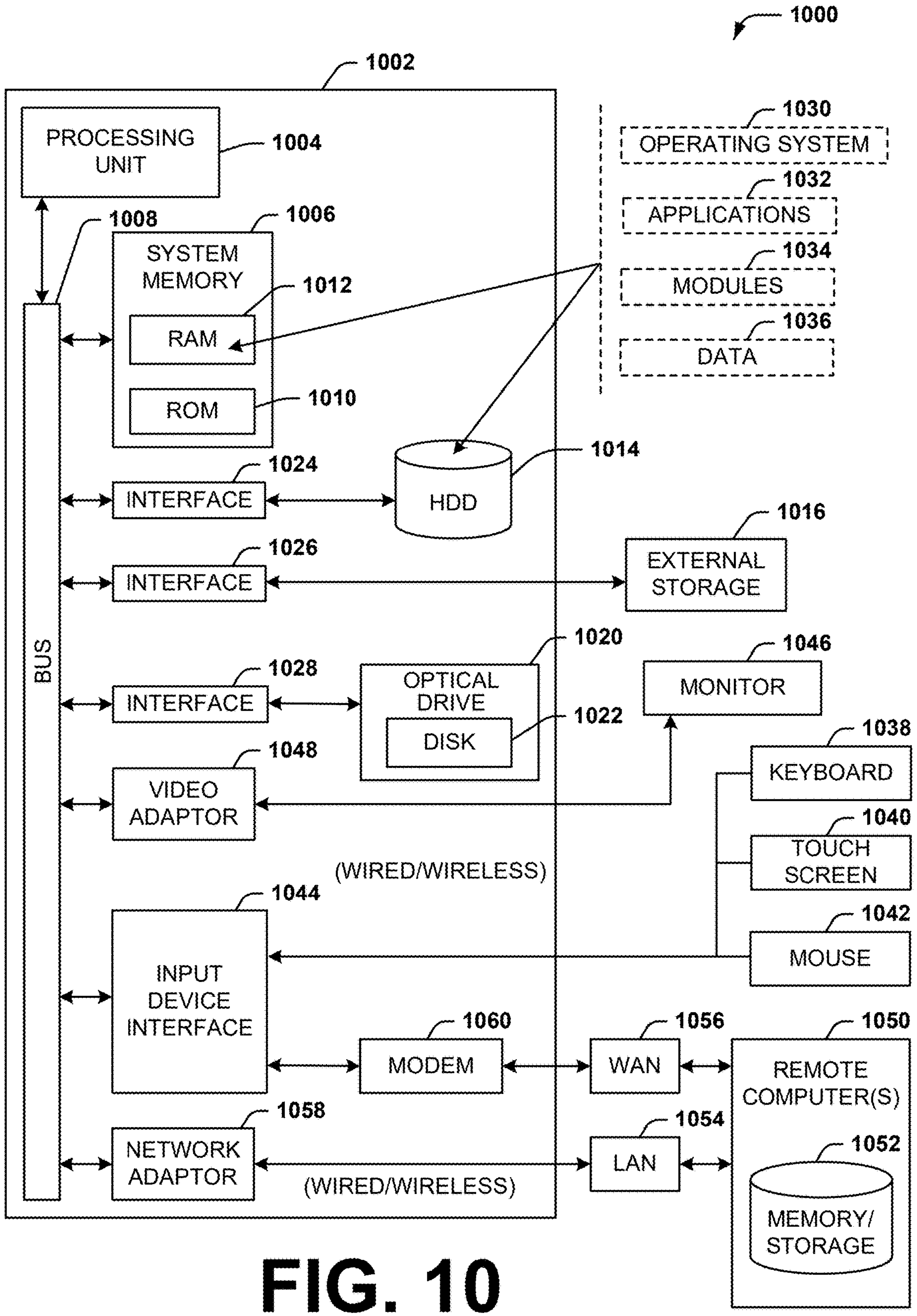
FIG. 10 illustrates a computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the. NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
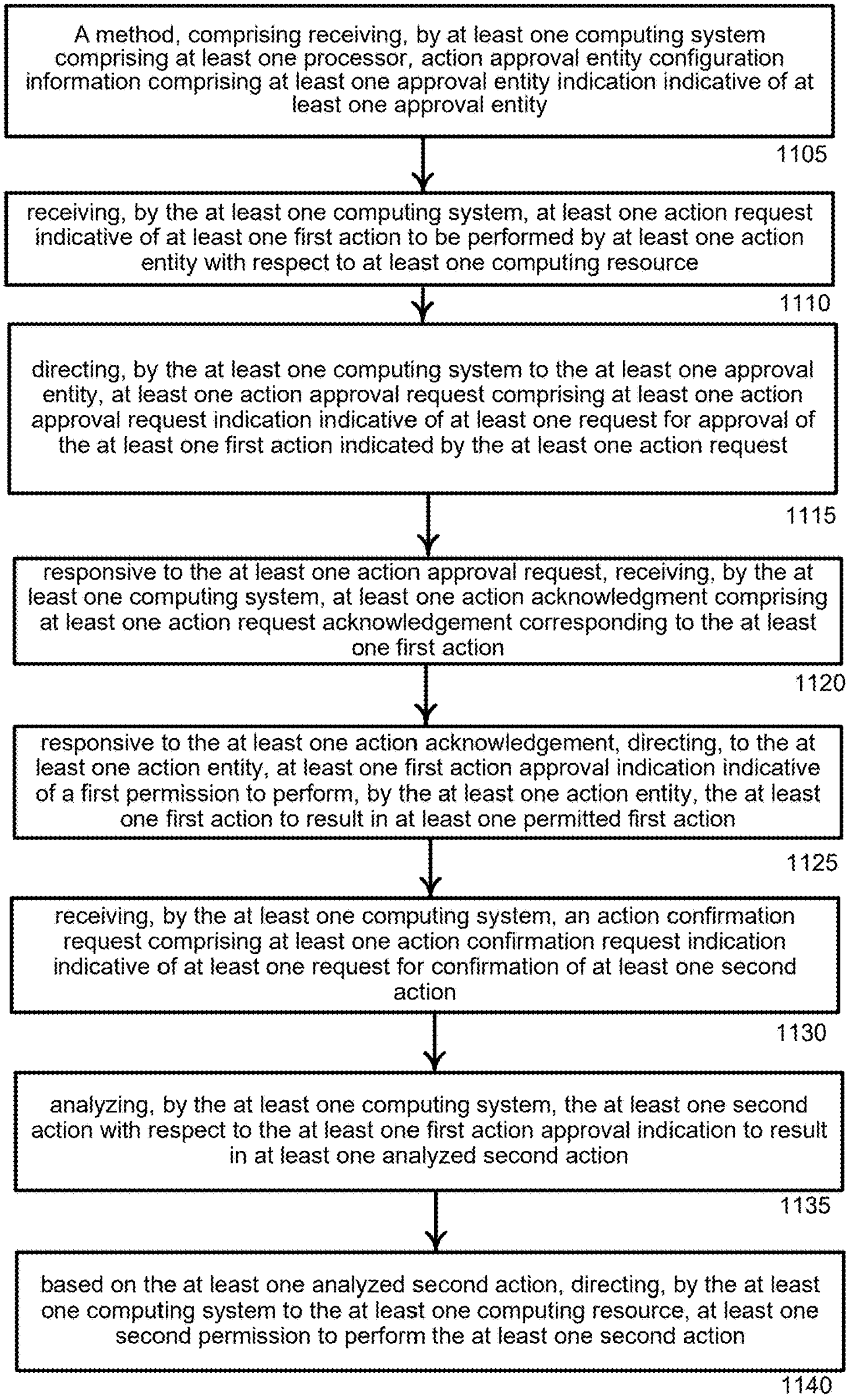
FIG. 11 illustrates a block diagram of an example method.

Turning now to FIG. 11, the figure illustrates an example method 1100 comprising at block 1105 receiving, by at least one computing system comprising at least one processor, action approval entity configuration information comprising at least one approval entity indication indicative of at least one approval entity; at block 1110 receiving, by the at least one computing system, at least one action request indicative of at least one first action to be performed by at least one action entity with respect to at least one computing resource; at block 1115 directing, by the at least one computing system to the at least one approval entity, at least one action approval request comprising at least one action approval request indication indicative of at least one request for approval of the at least one first action indicated by the at least one action request; at block 1120, responsive to the at least one action approval request, receiving, by the at least one computing system, at least one action acknowledgment comprising at least one action request acknowledgement corresponding to the at least one first action; at block 1125 responsive to the at least one action acknowledgement, directing, to the at least one action entity, at least one first action approval indication indicative of a first permission to perform, by the at least one action entity, the at least one first action to result in at least one permitted first action; at block 1130 receiving, by the at least one computing system, an action confirmation request comprising at least one action confirmation request indication indicative of at least one request for confirmation of at least one second action; at block 1135 analyzing, by the at least one computing system, the at least one second action with respect to the at least one first action approval indication to result in at least one analyzed second action; and at block 1140.

Figure 12:
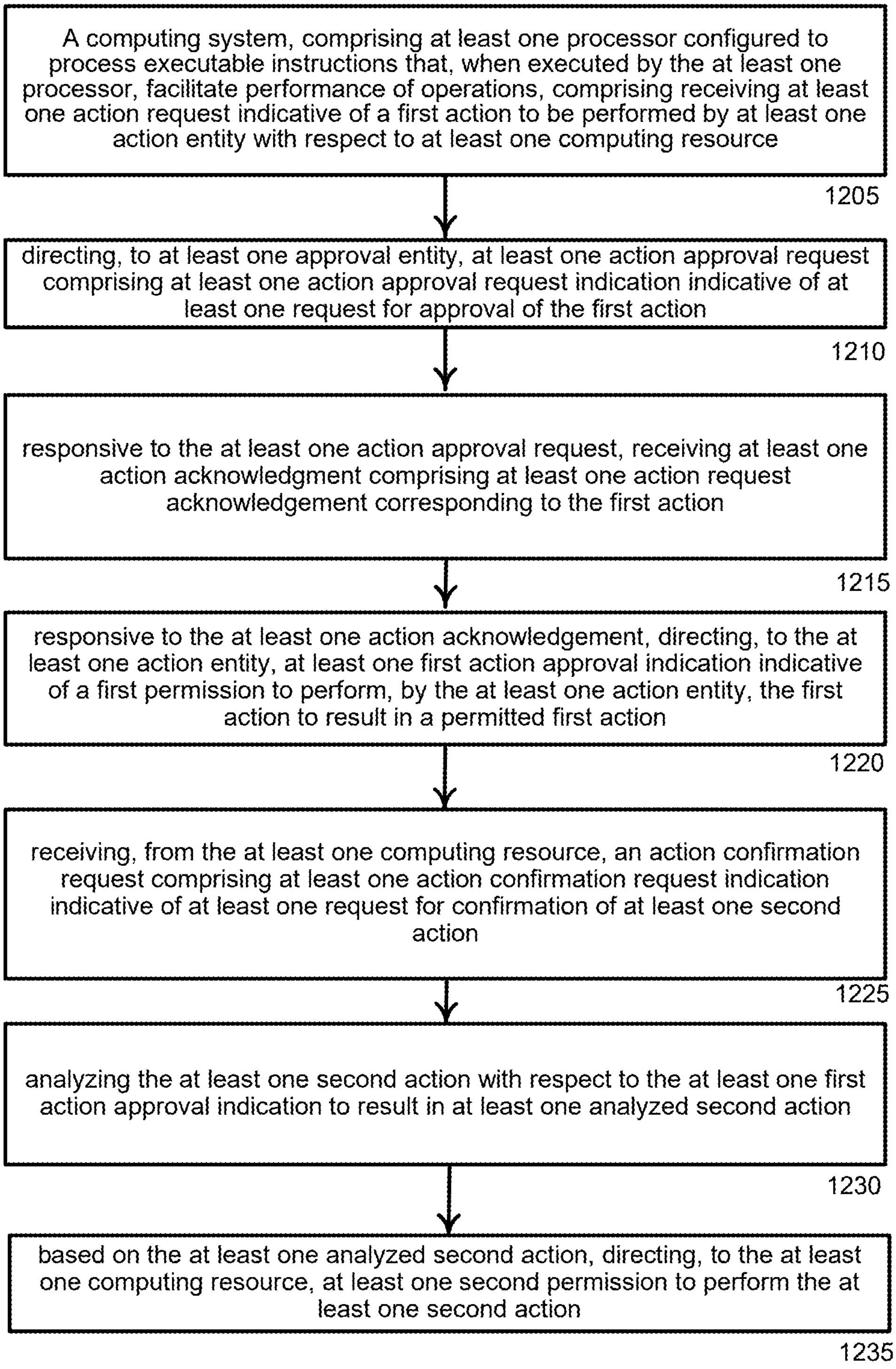
FIG. 12 illustrates a block diagram of an example system.

Turning now to FIG. 12, the figure illustrates am example computing system 1200, comprising at block 1205 at least one processor configured to process executable instructions that, when executed by the at least one processor, facilitate performance of operations, comprising receiving at least one action request indicative of a first action to be performed by at least one action entity with respect to at least one computing resource; at block 1210 directing, to at least one approval entity, at least one action approval request comprising at least one action approval request indication indicative of at least one request for approval of the first action; at block 1215, responsive to the at least one action approval request, receiving at least one action acknowledgment comprising at least one action request acknowledgement corresponding to the first action; at block 1220, responsive to the at least one action acknowledgement, directing, to the at least one action entity, at least one first action approval indication indicative of a first permission to perform, by the at least one action entity, the first action to result in a permitted first action; a block 1225 receiving, from the at least one computing resource, an action confirmation request comprising at least one action confirmation request indication indicative of at least one request for confirmation of at least one second action; at block 1230 analyzing the at least one second action with respect to the at least one first action approval indication to result in at least one analyzed second action; and at block 1235 based on the at least one analyzed second action, directing, to the at least one computing resource, at least one second permission to perform the at least one second action.

Figure 13:
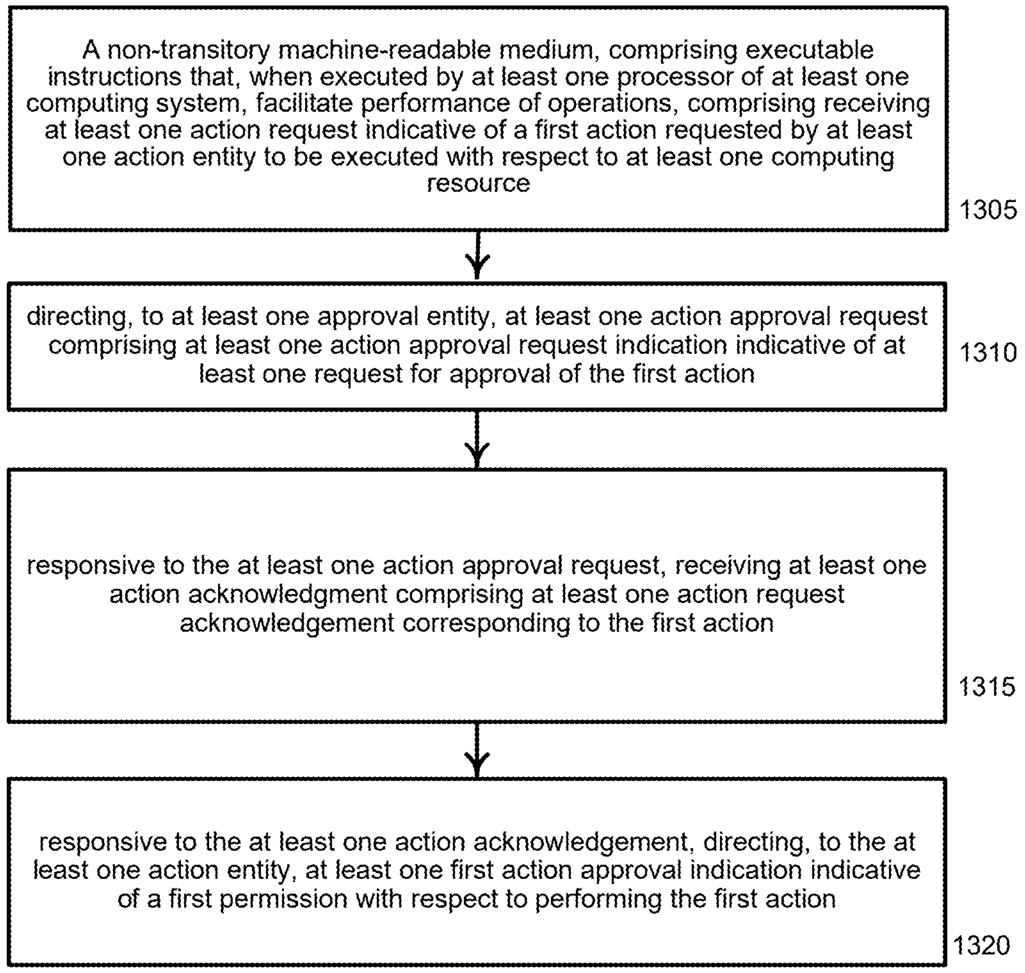
FIG. 13 illustrates a block diagram of an example non-transitory machine-readable medium.

Turning now to FIG. 13, the figure illustrates non-transitory machine-readable medium 1300, comprising at block 1305 executable instructions that, when executed by at least one processor of at least one computing system, facilitate performance of operations, comprising receiving at least one action request indicative of a first action requested by at least one action entity to be executed with respect to at least one computing resource; at block 1310 directing, to at least one approval entity, at least one action approval request comprising at least one action approval request indication indicative of at least one request for approval of the first action; at block 1315 responsive to the at least one action approval request, receiving at least one action acknowledgment comprising at least one action request acknowledgement corresponding to the first action; and at block responsive to the at least one action acknowledgement, directing, to the at least one action entity, at least one first action approval indication indicative of a first permission with respect to performing the first action.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by at least one computing system comprising at least one processor, action approval entity configuration information comprising at least one approval entity indication indicative of at least one approval entity;

receiving, by the at least one computing system, at least one action request indicative of at least one first action to be performed by at least one action entity with respect to at least one computing resource;

directing, by the at least one computing system to the at least one approval entity, at least one action approval request comprising at least one action approval request indication indicative of at least one request for approval of the at least one first action indicated by the at least one action request;

responsive to the at least one action approval request, receiving, by the at least one computing system, at least one action acknowledgment comprising at least one action request acknowledgement corresponding to the at least one first action;

responsive to the at least one action acknowledgement, directing, to the at least one action entity, at least one first action approval indication indicative of a first permission to perform, by the at least one action entity, the at least one first action to result in at least one permitted first action;

receiving, by the at least one computing system, an action confirmation request comprising at least one action confirmation request indication indicative of at least one request for confirmation of at least one second action;

analyzing, by the at least one computing system, the at least one second action with respect to the at least one first action approval indication to result in at least one analyzed second action; and based on the at least one analyzed second action, directing, by the at least one computing system to the at least one computing resource, at least one second permission to perform the at least one second action.

2. The method of claim 1, further comprising:

responsive to the at least one action request, generating, by the at least one computing system, at least one action token;

directing, by the at least one computing system to the at least one action entity, the at least one action token to be usable by the at least one action entity to facilitate performing the at least one first action with respect to the at least one computing resource; and directing, by the at least one computing system to the at least one computing resource, the at least one action token to be usable by the at least one computing resource to facilitate determining, by the at least one computing resource, that the at least one analyzed second action and the at least one permitted first action are the same.

3. The method of claim 1, further comprising:

determining, by the at least one computing system, that the at least one analyzed second action and the at least one permitted first action are different, wherein, based on the at least one analyzed second action and the at least one permitted first action being determined to be different, the at least one second permission to perform the at least one second action comprises a denial to perform the at least one second action.

4. The method of claim 1, further comprising:

determining, by the at least one computing system, that the at least one analyzed second action and the at least one permitted first action are the same, wherein, based on the at least one analyzed second action and the at least one permitted first action being determined to be the same, the at least one second permission to perform the at least one second action comprises an approval to perform the at least one second action.

5. The method of claim 1, wherein the at least one computing resource comprises at least one of: at least one operating system, at least one action approval services Pod, at least one containerized application management system instance, at least one remote access controller, at least one storage component, at least one storage service, at least one cloud-based workload, at least one virtual machine instance, at least one authentication service object, at least one account associated with at least one application, or at least one account associated with at least one computing equipment hardware component.

6. The method of claim 1, wherein at least one application specific interface corresponds to the at least one computing resource, and wherein the action approval entity configuration information is to be usable by the at least one computing system to facilitate interfacing with the at least one computing resource.

7. The method of claim 1, wherein the at least one action request comprises at least one of: at least one action indication indicative of the at least one first action, at least one computing resource information indication indicative of the at least one computing resource, at least one computing resource identifier indicative of at least one computing resource identifier associated with the at least one computing resource, at least one action entity identifier indicative of the at least one action entity, or at least one action payload indication indicative of payload to be associated with the at least one first action.

8. The method of claim 1, wherein the at least one computing system is a first computing system, and wherein the at least one of the at least one approval entity comprises at least one security service implemented by a second computing system.

9. The method of claim 1, wherein the at least one of the at least one approval entity comprises at least one user device, authenticated to be used by at least one user, identified by the action approval entity configuration information.

10. The method of claim 1, wherein the at least one action request is received via at least one management console associated with the at least one computing resource.

11. The method of claim 1, wherein the at least one computing system comprises the at least one computing resource.

12. The method of claim 1, wherein the at least one computing system is a first computing system, and wherein the at least one computing resource corresponds to a second computing system other than the first computing system.

13. A computing system, comprising at least one processor configured to process executable instructions that, when executed by the at least one processor, facilitate performance of operations, comprising:

receiving at least one action request indicative of a first action to be performed by at least one action entity with respect to at least one computing resource;

directing, to at least one approval entity, at least one action approval request comprising at least one action approval request indication indicative of at least one request for approval of the first action;

responsive to the at least one action approval request, receiving at least one action acknowledgment comprising at least one action request acknowledgement corresponding to the first action;

responsive to the at least one action acknowledgement, directing, to the at least one action entity, at least one first action approval indication indicative of a first permission to perform, by the at least one action entity, the first action to result in a permitted first action;

receiving, from the at least one computing resource, an action confirmation request comprising at least one action confirmation request indication indicative of at least one request for confirmation of at least one second action;

analyzing the at least one second action with respect to the at least one first action approval indication to result in at least one analyzed second action; and based on the at least one analyzed second action, directing, to the at least one computing resource, at least one second permission to perform the at least one second action.

14. The computing system of claim 13, wherein the at least one second action and the at least one first action approval indication are determined to be different, and wherein the at least one second permission is indicative that the at least one computing resource is to avoid performing of the at least one second action.

15. The computing system of claim 13, wherein the at least one second action and the at least one first action approval indication are determined to be the same, and wherein the at least one second permission is indicative that the at least one computing resource is to perform the at least one second action.

16. The computing system of claim 13, wherein the computing system is a first computing system and wherein a second computing system comprises the at least one computing resource.

17. A non-transitory machine-readable medium, comprising executable instructions that, when executed by at least one processor of at least one computing system, facilitate performance of operations, comprising:

receiving at least one action request indicative of a first action requested by at least one action entity to be executed with respect to at least one computing resource;

directing, to at least one approval entity, at least one action approval request comprising at least one action approval request indication indicative of at least one request for approval of the first action;

responsive to the at least one action approval request, receiving at least one action acknowledgment comprising at least one action request acknowledgement corresponding to the first action;

responsive to the at least one action acknowledgement, directing, to the at least one action entity, at least one first action approval indication indicative of a first permission with respect to performing the first action;

receiving, from the at least one computing resource, an action confirmation request comprising at least one action confirmation request indication indicative of at least one request for confirmation of approval to perform at least one second action;

analyzing the at least one second action with respect to the at least one first action approval indication to result in at least one analyzed second action; and based on the at least one analyzed second action, directing, to the at least one computing resource, at least one second permission indicative that the at least one computing resource has been approved to perform the at least one second action.

18. The non-transitory machine-readable medium of claim 17, wherein the at least one first action approval indication is indicative of the first permission being a denial of permission to perform the first action.

19. The non-transitory machine-readable medium of claim 17, wherein the at least one first action approval indication is indicative of the first permission being a granting of permission to perform the first action, and wherein the operations further comprise:

wherein the directing of the at least one second permission being indicative that the at least one computing resource has been approved to perform the at least one second action is based on the at least one analyzed second action being determined to be the same as the first permission being the granting of permission to perform the first action.

20. The non-transitory machine-readable medium of claim 17, wherein the at least one first action approval indication is indicative of the first permission being a granting of permission to perform the first action, and wherein the directing of the at least one second permission being indicative that the at least one computing resource has been approved to perform the at least one second action is based on the at least one analyzed second action being determined to be different than the first granting of the first permission.

* * * * *